Feb. 2, 1954
J. C. TYGART
2,668,060
COMBINED DUSTING AND BROADCASTING MACHINE
Filed April 12, 1952
2 Sheets-Sheet 1
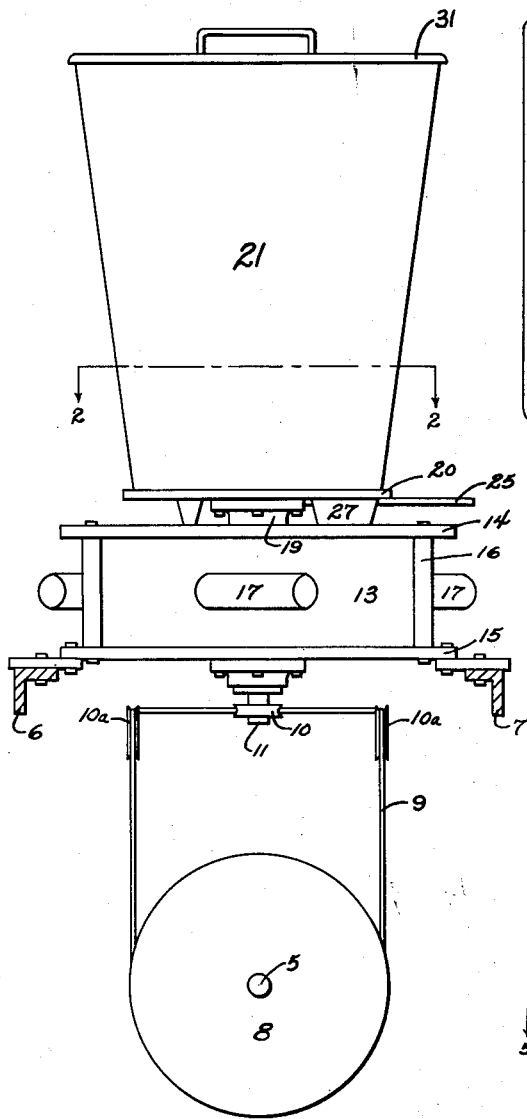
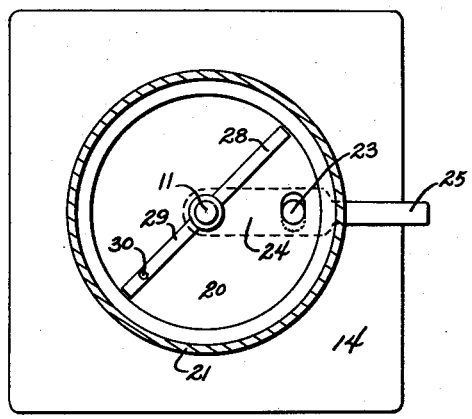
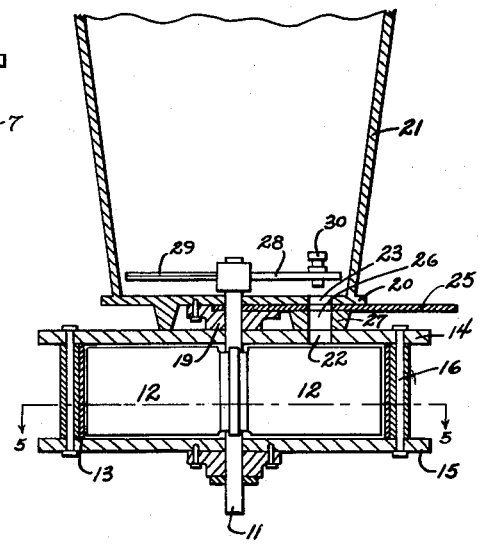
INVENTOR.
JAMES C. TYGART Feb. 2, 1954        J. C. TYGART        2,668,060
COMBINED DUSTING AND BROADCASTING MACHINE
Filed April 12, 1952        2 Sheets-Sheet 2
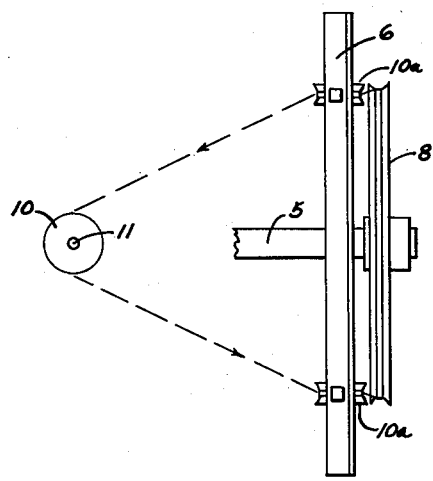
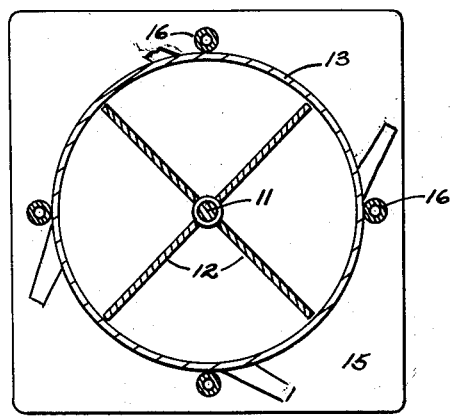
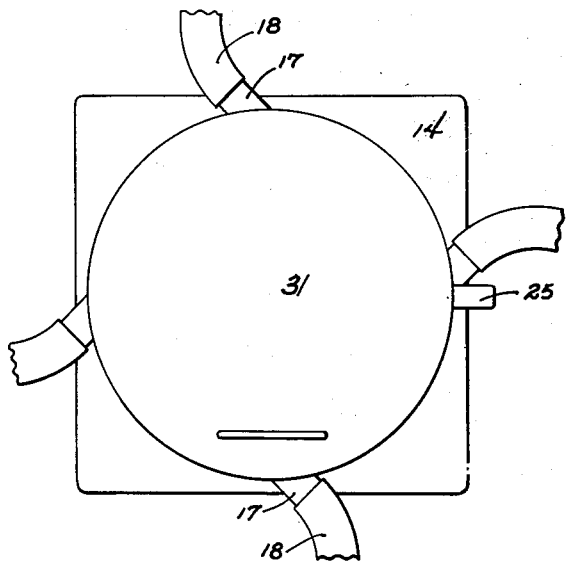
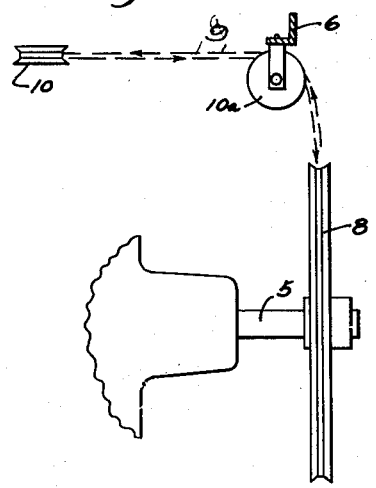
INVENTOR.
JAMES C. TYGART
BY Shepherd Campbell Patented Feb. 2, 1954

2,668,060

UNITED STATES PATENT OFFICE 2,668,060

COMBINED DUSTING AND BROADCASTING MACHINE

James C. Tygart, Nashville, Ga.

Application April 12, 1952, Serial No. 282,033

3 Claims. (Cl. 275—2)

This invention relates to agricultural distributing machines. The object of the invention is to provide a light weight economical unit adapted to serve either as a duster for agricultural insecticides or for a slinger type fertilizer distributor or a slinger type seeder.

The invention will be best understood by reference to the accompanying drawings wherein:

Fig. 1 is a rear elevation of the device of the invention;

Fig. 2 is a horizontal sectional view on line 2—2 of Fig. 1;

Fig. 3 is a vertical section through the hopper and associated parts;

Fig. 4 is a detail plan view illustrating the belt drive to the fan shaft of the device.

Fig. 5 is a horizontal section on line 5—5 of Fig. 3.

Fig. 6 is a plan view of the hopper; and

Fig. 7 is a detail side view of the drive to the fan shaft, from the power take-off shaft.

Like numerals designate corresponding parts throughout the figures of the drawing.

In the drawing, 5 designates a driven shaft such as the conventional power take-off shaft of a farm tractor, a portion of the frame of which is indicated at 6 and 7. A relatively large pulley 8 drives a smaller horizontal pulley 10, by means of a belt 9, the belt passing over guide pulleys 10a, secured to tractor frame member 6 (Fig. 4).

Pulley 10 is fast upon the lower end of and drives at relatively high speed, a vertical shaft 11. This shaft carries radial blades 12, which, when the device is to function as a duster, act as fan blades in a circumferential drumlike shell 13. This shell, together with the spaced top plate 14 and bottom plate 15, constitutes a fan housing. Shell 13 is separate from plates 14 and 15 and said plates are tied together and held in spaced relation to each other by bolts 16 and spacing sleeves 16a through which the said bolts pass. Thus the shell 13 may be securely bound between the plates by said bolts when the device is to be used as a duster but it may also be completely removed and still leave the plates 14 and 15 in their rigidly spaced relation, because the sleeves hold the plates apart and the bolts tend to draw them together. When the shell is in place and the device is functioning as a duster the dusting material is discharged through the tangential outlet pipes 17 and delivered into the flexible hoses 18. These hoses may be in any desired number and as is customary in dusting apparatus, may be provided with suitable nozzles upon their outer ends.

The top plate 14 carries the top bearing 19 for the shaft 11, and to this bearing is bolted the bottom 20 of a hopper 21. This hopper receives the dusting material, or fertilizer, or seed, as the case may be. Material from the hopper passes downwardly through an opening 22 of top plate 14, being delivered to said opening through an opening 23 formed in the bottom of the hopper and the rate of feed being controlled by a valve or feed cut off plate 24. The inner end of this plate is pivoted to swing about shaft 11 and its outer end projects outwardly far enough to constitute a handle 25. This valve plate works in a recess 26 formed in a protuberance 27 upon the underside of the hopper bottom. The several openings may be of simple circular form or they may be in the form of slightly elongated slots. By removing the circumferential shell 13 the device may be utilized as a slinger type broadcaster of either seed or fertilizer, the blades functioning, in that case, as rapidly revolving paddles which hurl the seed or fertilizer broadcast. It is possible to do this by mounting the plates 14 and 15 to stay rigidly in their spaced relation even after shell 13 is removed and this I do by the bolts 16 and spacing sleeves 16a.

Within the hopper the shaft 11 carries one or more agitating blades 28 and 29 and I preferably mount upon one of said blades an adjustable screw 30 which acts over the mouth of opening 23 to cause the material to flow freely into said opening. The agitating blades may be straight, as at 28, or they may be twisted to fan-like formation to exert a vertical thrust upon the material and to consequently impart vertical agitation thereto.

The hopper is preferably provided with a top 31. The shell 13 is arranged to be reversed so that the tangential outlet pipes will project in the proper direction to suit the direction of rotation of the fan. That is to say by merely turning the shell upside down the outlet pipes 17 project in the opposite direction from what they did before such inversion.

It is to be noted that this machine comprises a very small number of moving parts and yet it serves as a duster and a slinger type distributor or seeder. Thus it is not necessary to purchase a separate machine for each of these uses. The material is thoroughly agitated and evenly delivered. The structure is easy to clean and easy to repair.

Many ways will readily suggest themselves to those skilled in the art, of modifying the particular construction shown. Therefore it is to be understood that the invention is not limited to the precise construction and arrangement shown but that it includes within its purview whatever changes fairly come within either the terms or the spirit of the appended claims.

Having described my invention what I claim is:

1. A combined dusting and broadcasting machine comprising a hopper, a pair of spaced horizontally disposed plates below said hopper, a vertical, driven shaft, a plurality of blades carried by said shaft and disposed between said spaced plates, means for feeding material from the hopper to the space between said plates, a circumferential shell having outlet pipes in its sides and dimensioned to fit between said spaced plates and to there constitute together with said plates a fan housing within which said blades operate as a fan and means independent of the shell for maintaining said plates in position irrespective of the presence of the shell.

2. A combined dusting, seeding and broadcasting machine comprising a pair of horizontal plates vertically spaced from each other, means for holding said plates in such vertically spaced relation comprising bolts acting to draw the plates together and spacing members for holding said plates apart; a hopper supported above the uppermost plate, means for feeding material from said hopper into the space between said plates, a shaft passing vertically through the lowermost plate, fan blades upon said shaft and operating horizontally in the space between said plates and a circumferential drumlike shell dimensioned to be entered between said plates and to constitute together with said plates a fan housing, and discharge spouts carried by said shell, said shell being removable with respect to said hopper and plates and being independent of the means for holding the plates in their vertically spaced relation.

3. A structure as recited in claim 2 wherein the discharge spouts project tangentially from the shell and wherein the said shell is bodily invertable.

JAMES C. TYGART.

References Cited in the file of this patent

UNITED STATES PATENTS

| Number | Name | Date |
| --- | --- | --- |
| 922,028 | Parrish | May 18, 1909 |
| 1,639,370 | Flegel | Aug. 16, 1927 |
| 1,674,391 | Dunnagan | June 19, 1928 |
| 2,157,630 | Root | May 9, 1939 |
| 2,538,886 | Skibbe et al. | Jan. 23, 1951 |